Sept. 20, 1971 AKIRA SHIBATA 3,605,262

PRODUCTION OF RIVET-TYPE BIMETAL CONTACTS

Filed Nov. 14, 1968

INVENTOR.
AKIRA SHIBATA

BY

Hopgood & Calimafde
ATTORNEYS

United States Patent Office 3,605,262
Patented Sept. 20, 1971

3,605,262
PRODUCTION OF RIVET-TYPE BIMETAL CONTACTS

Akira Shibata, Tokyo, Japan, assignor to Chugai Electric Industrial Co., Ltd., Tokyo, Japan
Filed Nov. 14, 1968, Ser. No. 775,649
Claims priority, application Japan, Aug. 2, 1968, 43/54,693
Int. Cl. H01r *9/16*
U.S. Cl. 29—630C 4 Claims

ABSTRACT OF THE DISCLOSURE

A rivet-type bimetal contact is produced by coaxially superposing a linear piece of a ductile precious contact metal onto the end face of a different ductile metal with its opposite end anchored in a die, the contact faces of the two metals being freshly cut. The contact metal is axially upset by applying impact pressure to deform and flatten the superposed metals at least 20% of their height, and preferably at least 30 or 50%, to bring the cut faces into intimate and crystallographic contact whereby the interface is increased in area and effect cold bonding of the two faces, and then immediately heating the two metals to an elevated temperature below the melting points of the metals but above the recrystallization temperaure while under pressure to complete the deformation and form a high strength bond at the bimetal interface.

This invention relates to a method for producing bimetal electrical contacts of the rivet-type by pressure-bonding and, in particular, to a novel method for producing bimetal contacts characterized by high resistance to thermal shock and high strength at the bonding interface.

The contact metals employed in the rivet-type bimetal provided by the invention include the ductile precious metals silver, platinum, gold, palladium and alloys based on these metals; while the metal making up the base material of the bimetal rivet includes such metals as iron, mild steel, silver and silver alloys, nickel, nickel silver, aluminum and aluminum alloys, copper and copper alloys such as copper-zinc alloys, and the like.

In a copending application Ser. No. 788,258, filed Dec. 31, 1968, a method is provided for pressure-bonding a precious contact metal to a base material of another metal in which the metals are mutually responsive to cold pressure-bonding, the bonding being preferably performed at the interface between freshly cut surfaces. The electrical bimetal contacts produced by this method exhibit relatively better electrical and heat conductivity properties compared to similar contacts produced by such conventional methods of soldering, spot welding or by metal in-laying. However, such pressure-bonded contacts tended to separate, de-strip or delaminate at the interface with constant and aggravated use and when subjected to thermal shock due to stresses set up at the bonded interface.

It is thus the object of this invention to provide an improved bonding technique for producing bimetal contacts of the rivet type characterized in that an interfacial bond of high strength is obtained and characterized further in that the bond resists separation, de-stripping or delamination at the interface due to thermal shock and/or constant aggravated use in service.

Another object is to provide a method for producing bimetal contacts of the rivet type of improved life in which both the contact metal forming the top of the rivet and the metal forming the base material are generally mutually responsive to cold-pressure bonding but not sufficient to assure good bonding strength capable of withstanding de-stripping, delamination or separation at the interface. Thus, the method resides in the use of a novel combination of operational steps in which the bonding strength is improved to overcome the disadvantages inherent in previous methods.

Figure 1:
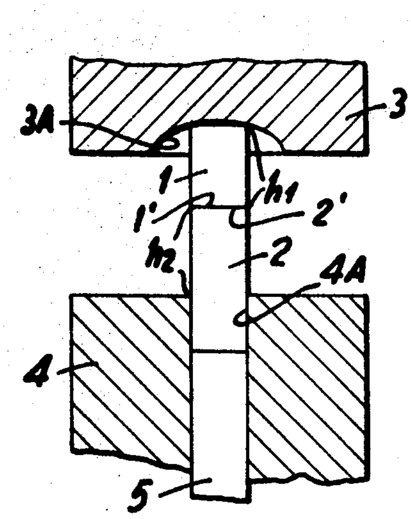
Figure 2:
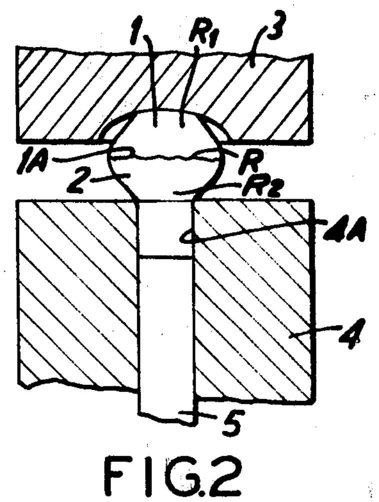
Figure 3:
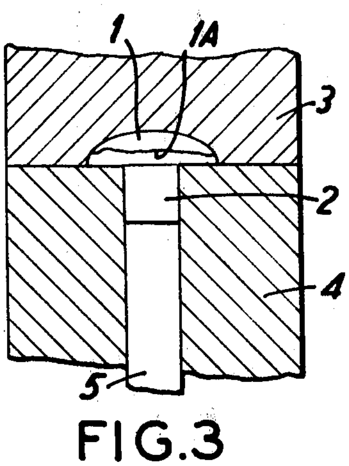
Figure 4:
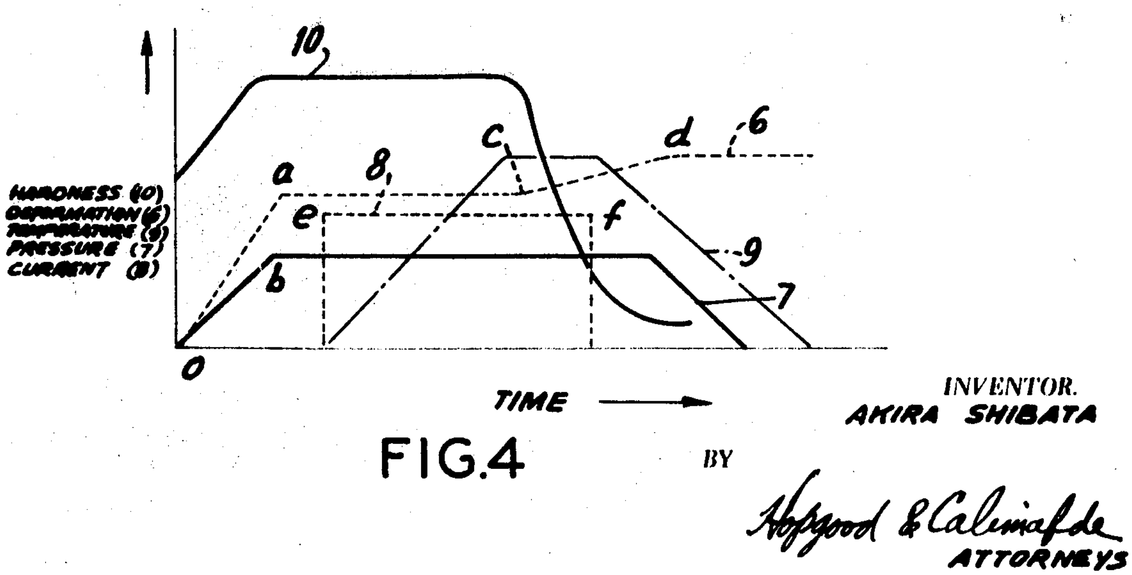

These and other objects will more clearly appear when taken in conjunction with the following disclosure and the accompanying drawings, wherein:

FIGS. 1 to 3 illustrate one preferred embodiment in carrying out the novel method; and FIG. 4 shows graphically the interrelation of pressure, temperature, hardness, deformation and heating current as a function of time in carrying out the novel combination of operational steps of the method provided by the invention.

In the method of the invention, the rivet type bimetal contact is produced by coaxially superposing a linear piece of a ductile precious contact metal onto the end face of a different ductile metal whose opposite end is supported snugly within a die opening. The contacting end faces of the two pieces are freshly cut before contacting them in order to optimize the bonding between them. The contact metal is then axially upset by the application of impact pressure to deform or flatten the contact metal together with the exposed portion of the base material, the amount of deformation being at least 20% of their height and, preferably, at 30 or 50%, in order to bring the cut end faces into intimate or crystallographic contact, the area at the interface being increased substantially beyond the original diameter of the contact metal and the base material. By crystallographic contact is meant bringing the end faces as close as 4 angstroms, more or less, as a result of which some cold bonding is set up due to molecular attraction. At this stage of upsetting, a balance is achieved between the applied pressure and the deformation resistance of the two metals. Immediately or substantially instantaneously after the upsetting, heat is applied elecrically to the deformed superposed metals while still under pressure to raise the temperature at the interface to above the recrystallization temperature but below the melting points of the metals to complete the deformaion and effect metallurgical bonding at the interface with little or no diffusion of the metals at the interface. This metallographic condition is important as it provides a clean interface having good electrical and heat conductive properties and improved resistance to de-stripping or separation during aggravated service under conditions involving thermal shock and stress. In a preferred aspect of the invention, a die punch or header is employed having a cavity of predetermined volume within which the contact metal is confined during deformation so as to assure the final shape and dimensions of the bonded contact.

The advantage of axially cold deforming the contact metal against the base material or substrate is that clean metal contact during initial compression is assured with the substrate. Moreover, before heat is applied to the compressed contact metal and base material, an intimate crystallographic contact is assured between the two metals at the interface. Apparently, because of the vigorous metal flow which occurs under high pressure along the interface, the contact metal is intimately and crystallographically brought in contact with the end face of the base material, the distance, as stated hereinbefore, between the two metals at the interface being of the order of a few angstroms, for example, as close to 4 angstroms, more or less. While such closeness of metal surfaces will result in some cold bonding, this by itself is not sufficient where optimum resistance to thermal shock and aggravated use are important. However, since there is a highly cold worked region at the interface due to the vigorous flow of contact metal along the interface, the immediate application of heat to the contact metal to raise it to a temperature above its recrystallization temperature while still under pressure results in immediate recrystallization of the cold worked region at the interface which leads to a strong crystallographic bond.

Where the contact metal is silver and where it, together with the exposed base material, has been cold deformed, for example, at least about 50% or higher in height before being heated, its recrystallization temperature is usually very low and may be as low as a few hundred degrees centigrade. It must be remembered, however, that the vigorous metal flow of both metals which occurs along and at the interface may be of a higher order of deformation than the metal away from the interface so that it may recrystallize at a more rapid rate and provide highly improved bonding with the metal substrate at the interface during the initial stages of heating under pressure.

The heating takes place in the order of up to about a few hundred milliseconds by passing a high surge of heating current across the interface for time periods of, for example, 20 to 150 or 200 milliseconds. Very strong bonds have been obtained with such short time heating. Recrystallization takes place simultaneously in both materials which results in reduced working strain and minimizes the formation of a diffusion zone at the bonded surface. Thus, by having an unstressed interface coupled with improved bonding, resistance to thermal shock is maximized.

Referring now to the drawings, and, in particular to FIG. 1, a linear piece of ductile contact metal 1, e.g., a segment of a wire, of a precious metal, such as silver, platinum, gold, palladium or alloys based on these metals, is provided with a freshly cut end face 1' as shown. The linear piece or wire segment 1 is coaxially superposed upon a corresponding linear piece or wire segment of a base material of a different ductile metal 2, such as silver, nickel, aluminum, copper and the like, which similarly has a freshly cut end face 2', the two freshly cut end faces being in contact with each other. The shank of the base material is anchored or snugly fitted within a die opening 4A and backed up by a supporting pin 5, leaving exposed a portion for deformation having a height $h_2$ corresponding to height $h_1$ of the contact metal. The two superposed pieces are located between a vertically movable upper punch 3 and lower die 4, the upper punch having a metal-forming cavity 3A, located substantially centrally at the end face thereof. The contact metal and the exposed base material have at least the same volume as that of the punch cavity, except that the total height $h_1$ and $h_2$ is greater than the depth of the cavity so that the metals can be reduced in height at least greater than 20%, generally at least more than 30% and, more preferably, at least about 50% and higher. The metals are deformed by bringing down the punch as shown in FIG. 2. Depending upon the amount of impact pressure and speed of punch 3 against die 4, the contact metal and the base material can be vigorously cold worked or deformed to lower their recrystallization temperatures substantially. Thus, as stated hereinbefore in the case of highly deformed silver, the recrystallization temperature may be below a few hundred ° C., e.g. 200° C. to 300° C. or even lower.

The pressure is first applied by the punch until a relative balance is obtained between the applied pressure and the deformation resistance of the contact metal. As shown in FIG. 2, the punch approaches die 4 (which is water cooled) to effect some deformation without touching it, following which a high current is immediately applied across the punch and die, causing the metals to heat to above the recrystallization temperature at and to each side of the interface and flow still further and fill up the cavity completely as shown in FIG. 3 to form the bimetal rivet between the punch and die shown in FIG. 3. During cold compression, the contact metal flows along the interface 1A between it and the base metal 2 to provide intimate crystallographic contact with the substrate, that is to say, contact in which molecular forces of attraction come into play, following which the deformed metals are immediately heated and the remainder deformation completed (FIG. 3) and bonding effected at the interface with practically no or minimum diffusion of the metal into the other across the interface. By first applying the pressure on the cold metals, the inflow of the ambient atmosphere is prevented and, thus, oxidation is avoided along the clean interface during the heating step as punch 3 meets the surface of die 4. As stated hereinabove, the voltage necessary to supply the current is substantially instantaneously applied before punch 3 meets die 5. The current flow between punch 3 and die 5 causes the metals to heat up and deform further. Since the partially deformed metals immediately soften upon heating, metal flows quickly to fill up the punch cavity and while bonding cleanly to the base material.

The amount of heat necessary is easily determined by trial and error so long as the temperature exceeds the recrystallization temperatures of the metals and is below the melting points. If the temperature does not exceed the recrystallization point of the metal, then the metals will not flow appreciably at the interface and a high strength bond may not be obtained. On the other hand, if melting to any degree occurs at the interface, substantial diffusion is apt to occur across the interface leading to the disadvantages which are encountered in spot welding, soldering or brazing. Assuming the total height to be deformed is 4 mm., exclusive of the metal in the die, it might first be deformed to a height of 2 mm. (50% reduction in height) and immediately heated to above the recrystallization temperature while under pressure and the height then further reduced to 1 mm. to cause the metal to fill up the cavity and bond itself still further at the interface during completion of recrystallization. As will be apparent from FIG. 2, when substantial deformation is effected so that the interface 1A increases in area to achieve crystallographic contact, the electrical resistance R at the interface may be equal to or lower than the resistance $R_1$ and $R_2$ of the contact metal and base material respectively. Thus, when a difference in electrical potential is applied across the contact metal and the base of the rivet, both metals are heated to above the recrystallization temperature and below the melting point without high resistance to heat generation at the interface of the deformed metals. This contributes to forming a uniform and strong bond at the interface of both metals. In addition, the heating eliminates cold work strain which renders the bond more stable under conditions of thermal shock in use.

The factors which enter into the method of the invention are illustrated in FIG. 4 which relates the hardness 10, deformation 6, temperature 9, pressure 7 and current 8 as a function of time. As the pressure is applied as shown in FIGS. 1 and 2, the pressure rises to the level *b* and is maintained at that level as shown for upwards of one second, more or less. In the meantime, the hardness 10 rises to the level shown as the metal is deformed to the level *a*, e.g. 50%, shown in curve 6 and continued at that level to *c*. Immediately after the metals have been cold deformed to the level *a*, heating current is applied to a level *e–f* for several hundred milliseconds. The temperature of the metals still under pressure rises as shown in curve 9 and reaches an optimum level above the recrystallization temperature of the metals. As the metals heat up above the recrystallization temperature while under pressure, they deform still further and fill up the punch cavity as shown by the deformation increase from *c* to *d* on curve 6 due to the softening of the metals (note the hardness drop of curve 10 following application of heating). At *f* of curve 8, the current is shut off and the temperature drops as shown in curve 9, the pressure thereafter being relieved as shown by curve 7. As stated above, the cycle may be carried out over a total time of about one second or so, the heating being carried out within the total cycle over a time period of up to about several hundred, e.g. 200, milliseconds or more.

As illustrative of the novel method for producing bimetal contacts of the rivet type, the following examples are given:

EXAMPLE 1

A linear piece of copper, e.g., a wire segment having a diameter of 2 mm. and a length of 4 mm. is snugly inserted into die opening 4A (note FIG. 1), leaving a 2 mm. portion of the piece exposed above the die, the inserted portion being backed up or supported by die pin 5. A linear piece of silver 2 mm. in diameter and 2 mm. high is coaxially superposed on top of the supported copper piece, the contacting end faces of both pieces having previously been freshly cut. Punch 3, having a cavity 3A centrally located at its compacting face of about 4 mm. in diameter and 1 mm. deep, is brought vertically down in contact against the silver contact metal and impact pressure applied to upset the superposed metals until the interface 1A is increased in diameter to approximately 3.6 mm. (note FIG. 2). Immediately thereafter, a voltage of about 2.2 and a current of 250 amperes are applied between the punch and the die (which is preferably water cooled) for a period of about 300 milliseconds to heat the metals at least at the interface to 280° C. (above the recrystallization temperature) while under pressure and the deformation completed by additional metal flow due to softening or annealing of the metal above the recrystallization temperature. The bimetal contact produced had a top or head dimension of about 4 mm. in diameter and 1 mm. thick and an extending shank portion of copper 2 mm. in diameter and 2 mm. long.

The bimetal rivet produced in accordance with the foregoing method was incorporated in a relay for a destripping or a delamination test. An alternating current of 200 volts, 50 amperes and a power factor of about 0.3 was applied and at this power load (about 3000 watts) an oscillating opening and closing test was carried out at the rate of 1,200 times per hour. After a total of 50,000 oscillations of making and breaking contact, no de-stripping or separation of the contact metal was observed.

However, in a test conducted where the bimetal rivet was made by cold bonding only, the contact metal separated or de-stripped from the base material after only 2,000 of opening and closing of the relay. This is an improvement in life of substantally over 25 times, keeping in mind that the bimetal contact of the invention did not fail.

EXAMPLE 2

A linear piece of silver having a diameter of 1.5 mm. and a length of 3 mm. is snugly inserted at its shank end into the die opening 4A and supported by die pin 5 to provide an exposed portion 2 mm. high. A linear piece of platinum 1.5 mm. in diameter and 2 mm. long is coaxially superposed on top of the supported silver piece, the contacting end faces of both pieces having previously been freshly cut. Punch 3, having a cavity 3A of about 3 mm. in diameter and a depth of 1 mm., is brought vertically down in contact against the platinum contact metal and impact pressure applied to upset the superposed metals until the interface between the silver base material and the platinum is increased in diameter by deformation to approximately 2.7 mm. Immediately, at this point, while the pressure is still applied, a voltage of 2.5 and a current of 180 amperes are applied between the punch and the die for a period of 15 milliseconds to cause the temperature to rise to 320° C. which is above the recrystallization temperatures of the metals. As a result of the heating, the metals deformed further under the compression load to produce a composite platinum-silver bimetal contact of the rivet type having a head dimension of 3 mm. in diameter and 1 mm. in thickness and an extending shank portion of silver of 1.5 mm. in diameter and 1 mm. long.

The contact was subjected to thermal shock and then left in a furnace at 700° C. for 30 seconds. Upon removal from the furnace and cooling, the contact was crushed with a vise around the top or head portion and an attempt made to de-strip the platinum contact with a pair of pincers or pliers. No stipping occurred at the interface, thus indicating that the bond was of very good quality, had high strength and resisted thermal shock.

EXAMPLE 3

A linear piece of silver or wire segment of about 1 mm. in length and 1.5 mm. in diameter is inserted at its shank end into a 1 mm. opening of die 4 to a depth of 0.5 mm., leaving a length of 1 mm. exposed for bonding with a linear piece of a gold-silver alloy containing 10% gold having a diameter of 1 mm. and a length of 1 mm. A freshly cut end face of the gold alloy was placed in contact with a freshly cut end face of the supported silver piece, the gold alloy being coaxially superposed onto the silver base material and the two subjected to axial compression by bringing punch 3 vertically down upon the exposed end of the gold alloy piece, the metal forming cavity of the punch being 2 mm. in diameter and 0.5 mm. deep. As a result of the deformation, the freshly cut end surfaces are brought into intimate and crystallographic contact, wherein the diameter at the interface is increased to approximately 1.8 mm. Immediately following, while the pressure is still applied, an alternating current of 2 volts and 120 amperes is applied for about 10 milliseconds to raise the temperature to 350° C., which is above the recrystallization temperatures of the metals, and the metals compressed and deformed to fill the cavity up completely. The finished bimetal rivet had a head diameter of 2 mm. and a thickness of 0.5 mm. and a shank length of 0.5 mm. with a diameter of 1 mm.

The bimetal contact produced in accordance with the foregoing example was subjected to a shearing test at the interface bond, resulting in a failure by shear at a load of 28 kg./min.$^2$ which is indicative of a strong bond.

Additional examples were prepared using such contact metals as Ag-Cd (13%); Au-Ag-Pt; Au; Ag-CdO (10%); Ag-Ni; Au-Ag-Ni; Ag; Au-Ni; Ag-Pd; etc. These examples are itemized in Tables I, II and III. Table I sets forth the materials, their dimensions and the die and punch dimensions. Table II sets forth the degree of cold deformation (increase in diameter of the interface) before the application of heat, the amount of power employed for the heating, the time of power application and the temperature to which the metals are heated; while Table III gives the finished dimensions of the bimetal contact and a brief summary of the test results. The symbol $^{\phi}$ stands for diameter, $l$ is length and $h$ is height.

TABLE I

| Example Number | Material: Contact, percent | Material: Base | Dimensions of linear piece: Contact, mm. | Dimensions of linear piece: Base, mm. | Length of insertion in die, mm. | Cavity of punch, mm. |
|---|---|---|---|---|---|---|
| 4 | Ag-Cd (13) | Cu | 2.5$^{\phi}$ x 2$^{l}$ | 2.5$^{\phi}$ x 4.5 | 2.5 | 5$^{\phi}$ x 1$^{h}$ |
| 5 | Au 69, Ag 25, Pt 6 | Ni | 1.2 x 2.1 | 1.2 x 3.1 | 1.0 | 2.5 x 1 |
| 6 | Au 25, Ag 74.7, Ni 0.3 | Ag | 1.5 x 1.75 | 1.5 x 3.25 | 1.5 | 2.8 x 1 |
| 7 | Au | Al | 1.0 x 1 | 1.0 x 1.5 | 0.5 | 2 x 0.5 |
| 8 | Au | Ag | 1.2 x 1.1 | 1.2 x 2.1 | 1.0 | 2.3 x 0.6 |
| 9 | Ag-CdO (10) | Cu | 3.0 x 2 | 3.0 x 3 | 1.0 | 6 x 1 |
| 10 | Ag-Ni (10) | Ag | 2.5 x 2.45 | 2.5 x 4.45 | 2.0 | 4.5 x 1.5 |
| 11 | Au 25, Ag 74.7, Ni 0.3 | Fe* | 2 x 1.2 | 2 x 2.2 | 1.0 | 3.5 x 0.8 |
| 12 | Au 69, Ag 25, Pt 6 | Ag | 1.5 x 0.7 | 1.5 x 1.7 | 1.0 | 2.3 x 0.6 |
| 13 | Ag | Al | 2.0 x 1.1 | 2.0 x 2.1 | 1.0 | 3 x 1 |
| 14 | Ag-Pd (30) | Fe* | 2.0 x 0.77 | 2.0 x 1.27 | 0.5 | 3.5 x 0.5 |
| 15 | Au 95, Ni 5 | Al | 1.5 x 1.1 | 2.0 x 1.6 | 0.5 | 2.5 x 0.8 |
| 16 | Au 69, Ag 25, Pt 6 | Al | 1.0 x 1 | 1.0 x 1.5 | 0.5 | 2 x 0.5 |
| 17 | Au 25, Ag 74.7, Ni 0.3 | Cu | 1.2 x 1.1 | 1.2 x 2.1 | 1.0 | 2.3 x 0.6 |

*Less than .05% C.

TABLE II

| Example Number | Degree of deformation before electricity application, approximate diameter, mm. | Electricity application condition: Voltage | Current flow (amps) | Periods, milliseconds | Temperature, ° C. |
|---|---|---|---|---|---|
| 4 | 4.5$^{\phi}$ | 2.8 | 400 | 45 | 300 |
| 5 | 2.3 | 1.8 | 200 | 60 | 360 |
| 6 | 2.6 | 2.0 | 200 | 20 | 340 |
| 7 | 1.8 | 1.5 | 150 | 50 | 270 |
| 8 | 2.0 | 1.8 | 210 | 40 | 250 |
| 9 | 5.4 | 2.5 | 600 | 120 | 270 |
| 10 | 4.2 | 2.0 | 400 | 50 | 330 |
| 11 | 3.2 | 2.3 | 250 | 60 | 300 |
| 12 | 2.1 | 1.7 | 180 | 40 | 250 |
| 13 | 2.8 | 2.1 | 240 | 30 | 280 |
| 14 | 3.2 | 2.6 | 210 | 150 | 450 |
| 15 | 2.2 | 2.0 | 180 | 60 | 320 |
| 16 | 1.8 | 1.8 | 160 | 30 | 350 |
| 17 | 2.1 | 1.8 | 170 | 20 | 260 |

TABLE III

| Example Number | Finished top portion | Contact shank portion | Stripping test |
|---|---|---|---|
| 4 | (5 x 1) | (2.5 x 2.5) | Relay test: AC 200 v.; P.F. 0.3; 50 a.; 1,200 times/hr.; Result: No stripping, after 50,000 times test. |
| 5 | (2.5 x 1) | (1.2 x 1) | Shearing test: 34 kg./mm.$^2$. |
| 6 | (2.8 x 1) | (1.5 x 1.5) | Crushing test: No stripping. |
| 7 | (2 x 0.5) | (1 x 0.5) | Shearing test: 14 kg./mm.$^2$. |
| 8 | (2.3 x 0.6) | (1.2 x 1) | Shearing test: 27 kg./mm.$^2$. |
| 9 | (6 x 1) | (3 x 1) | Relay test: AC 200 v.; P.F. 0.3; 50 a.; 1,200 times/hr.; Result: No stripping, after 50,000 times test. |
| 10 | (4.5 x 1.5) | (2.5 x 2) | Do. |
| 11 | (3.5 x 0.8) | (2 x 1) | Crushing test: No stripping. |
| 12 | (2.3 x 0.6) | (1.5 x 1) | Shearing test: 29 kg./mm.$^2$. |
| 13 | (3 x 1) | (2 x 1) | Crushing test: No stripping. |
| 14 | (3.5 x 0.5) | (2 x 0.5) | Shearing test: 30 kg./mm.$^2$. |
| 15 | (2.5 x 0.8) | (1.5 x 0.5) | Shearing test: 15 kg./mm.$^2$. |
| 16 | (2 x 0.5) | (1 x 0.5) | Shearing test: 14.5 kg./mm.$^2$. |
| 17 | (2.3 x 0.6) | (1.2 x 1) | Crushing test: No stripping. |

As will be readily apparent from Table III, good test results were obtained. It will be noted with respect to Ex. Nos. 4, 9 and 10 that the relay test conducted using an alternating current of 200 volts, 50 amperes and a power factor of 0.3 at a make-and-break rate of 1200 times/hour continued to operate for as long as 50,000 times without any stripping of the contact metal. In the case of Ex. No. 4, the contact metal was a Ag-Cd (13%) alloy and the shank copper; in Ex. No. 9, the contact alloy was Ag-CdO (10%) and the shank copper; while in Ex. No. 10, the alloy was Ag-Ni (10%) and the shank silver.

In the case of Ex. No. 14, in which the contact metal is Ag-Pd (30%) and the shank low carbon iron (also referred to as Armco iron), a relatively high shear strength of 30 kg./mm.$^2$ was obtained. Even where the bimetal contact was subjected to an aggravated crushing test as described in Ex. No. 2 (note Ex. Nos. 6, 11, 13 and 14), no stripping away of the contact metal occured at the interface.

As stated herein, the method of the invention is applicable to contact metals selected from the group consisting of silver, platinum, gold, palladium and alloys based on these metals. Examples of such alloys are: 10% Cd and the balance Ag; 90% Ag-10% CdO; 90% Ag-10% Ni; 70% Ag-30% Pd; 74.5% Ag-25% Au-0.5% Ni; 95% Ag-5% Ni; 90% Ag-10% Cu; 72% Ag-26% Cu-2% Ni; 97% Ag-3% Pd; 97% Ag-3% Pt; up to 30% WC and the balance essentially silver; 95% Pt-5% Ir; 85% Pt-15% Ir; 90% Pt-10% Ru; 96% Pt-4% W; 90% Pd-10% Ru; 70% Pd-30% Ag; 72% Pd-26% Ag-2% Ni; 45% Pd-30% Ag-20% Au-5% Pt; 90% Au-10% Cu; 75% Au-25% Ag; 69% Au-25% Ag-6% Pt; 41.7% Au-32.5% Cu-18.8% Ni-7% Zn; and the like electrical contact alloys. The foregoing compositions are merely illustrative of electrical contact metals based substantially on the precious metals Ag, Pt, Au and Pd.

As stated with respect to the ductile based materials, these may include low carbon or mild steel (<0.05% C), iron, nickel, aluminum, aluminum-base alloys, copper and alloys of copper-zinc, and other copper-base alloys, e.g., copper-base silver alloys or silver-base copper alloys, nickel silver, silver and silver-base alloys.

Nickel silver, otherwise known as German silver, may comprise 45 to 65% copper, 15 to 40% zinc and 8 to 35% nickel. A typical example of nickel silver is one containing 55% copper, 25% zinc and 20% nickel.

Typical copper-zinc alloys include those falling in the range of 5 to 40% zinc and the balance copper. The copper-silver alloys include those ranging from 5 to 95% copper and 95 to 5% silver. Other silver alloys are those containing 5 to 20% Ni and the balance essentially silver; etc. Another base material which may be used is one containing 5 to 35% nickel and the balance essentially copper.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of forming a rivet-type bimetal contact having a ductile contact metal forming the top of said rivet bonded to a different ductile metal forming the base of said rivet which comprises, taking a linear piece of a precious ductile contact metal selected from the group consisting of silver, platinum, gold, palladium and alloys based on these metals having a freshly cut end face and coaxially superposing said freshly cut end face of said linear piece on a freshly cut end face of a free end of a corresponding linear piece of a different ductile metal anchored at its opposite shank end in a die, axially upsetting the superposed contact metal and the free end portion of the different metal by applying impact pressure whereby to deform partially and flatten the superposed metals at least about 20% of their height and cause said metals to cold flow along their common interface and increase the interfacial area of contact until a balance is achieved between the applied pressure and the deformation resistance of the metals as a result of said partial deformation; wherein the two freshly cut faces are brought into intimate and crystallographic contact and effect cold pressure-bonding of the two faces at said interface while substantially preventing inflow of ambient atmosphere above the interface, and immediately heating the superposed metals to an elevated temperature above their crystallization temperature but below their melting point while under said applied pressure to complete the deformation, to eliminate cold work strain at the interface and form a high strength bond at the bimetal interface while substantially avoiding oxidation along said interface.

2. The method of claim 1, wherein the metal forming the base of the contact is selected from the group consisting of iron, mild steel, nickel, aluminum, aluminum-base alloys, copper, copper-base alloys, silver, silver-base alloys and nickel silver.

3. The method of claim 1, wherein the superposed metals are reduced in height at least about 30% of their deformable height, and wherein the superposed deformed metals are heated to above the recrystallization temperature over a very short time period of up to about several hundred milliseconds.

4. The method of claim 1, wherein the superposed metals are reduced in height at least about 50% of their deformable height, and wherein the superposed deformed metals are heated to above the recrystallization temperature over a very short time period of up to about several hundered milliseconds.

References Cited

UNITED STATES PATENTS

| | | | |
|---|---|---|---|
| 2,247,829 | 7/1949 | Ziegs | 29—630CUX |
| 2,703,998 | 3/1955 | Sowter | 29—470.1 |
| 2,739,370 | 3/1956 | Cooney | 29—630C |
| 3,341,943 | 9/1967 | Gwyn, Jr. | 29—630C |
| 3,371,414 | 3/1968 | Gwyn, Jr. | 29—630C |
| 3,397,454 | 8/1968 | Gwyn, Jr. | 29—630C |

GRANVILLE Y. CUSTER, Jr., Primary Examiner